US011545134B1

United States Patent
Federico et al.

(10) Patent No.: US 11,545,134 B1
(45) Date of Patent: Jan. 3, 2023

(54) MULTILINGUAL SPEECH TRANSLATION WITH ADAPTIVE SPEECH SYNTHESIS AND ADAPTIVE PHYSIOGNOMY

(71) Applicant: Amazon Technologies, Inc., Seattle, WA (US)

(72) Inventors: Marcello Federico, Mountain View, CA (US); Robert Enyedi, Santa Clara, CA (US); Yaser Al-Onaizan, Cortlandt Manor, NY (US); Roberto Barra-Chicote, Cambridge (GB); Andrew Paul Breen, Norwich (GB); Ritwik Giri, Sunnyvale, CA (US); Mehmet Umut Isik, Menlo Park, CA (US); Arvindh Krishnaswamy, Palo Alto, CA (US); Hassan Sawaf, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/709,792

(22) Filed: Dec. 10, 2019

(51) Int. Cl.
*G10L 13/08* (2013.01)
*G10L 15/22* (2006.01)
(Continued)

(52) U.S. Cl.
CPC .............. *G10L 13/10* (2013.01); *G06F 40/47* (2020.01); *G06V 40/161* (2022.01); *G10L 13/00* (2013.01);
(Continued)

(58) Field of Classification Search
CPC .......... G10L 15/26; G10L 13/00; G10L 17/00
See application file for complete search history.

(56) References Cited

U.S. PATENT DOCUMENTS

| 2004/0234250 A1* | 11/2004 | Cote | ...................... G11B 27/10 386/244 |
| 2005/0042591 A1* | 2/2005 | Bloom | ................. G11B 27/034 434/307 A |

(Continued)

OTHER PUBLICATIONS

Öktem, Alp, Mireia Farrús, and Antonio Bonafonte. "Prosodic phrase alignment for machine dubbing." arXiv preprint arXiv: 1908.07226 (Sep. 2019). (Year: 2019).*

(Continued)

*Primary Examiner* — Jialong He
(74) *Attorney, Agent, or Firm* — Nicholson De Vos Webster & Elliott LLP

(57) ABSTRACT

Techniques for the generation of dubbed audio for an audio/video are described. An exemplary approach is to receive a request to generate dubbed speech for an audio/visual file; and in response to the request to: extract speech segments from an audio track of the audio/visual file associated with identified speakers; translate the extracted speech segments into a target language; determine a machine learning model per identified speaker, the trained machine learning models to be used to generate a spoken version of the translated, extracted speech segments based on the identified speaker; generate, per translated, extracted speech segment, a spoken version of the translated, extracted speech segments using a trained machine learning model that corresponds to the identified speaker of the translated, extracted speech segment and prosody information for the extracted speech segments; and replace the extracted speech segments from the audio track of the audio/visual file with the spoken versions spoken version of the translated, extracted speech segments to generate a modified audio track.

20 Claims, 9 Drawing Sheets

(51) Int. Cl.
*G11B 20/10* (2006.01)
*G06F 3/16* (2006.01)
*G10L 13/10* (2013.01)
*G06F 40/47* (2020.01)
*G10L 25/90* (2013.01)
*G10L 15/06* (2013.01)
*G10L 13/00* (2006.01)
*G10L 15/26* (2006.01)
*G06V 40/16* (2022.01)

(52) U.S. Cl.
CPC ............ *G10L 15/063* (2013.01); *G10L 15/22* (2013.01); *G10L 15/26* (2013.01); *G10L 25/90* (2013.01)

(56) References Cited

U.S. PATENT DOCUMENTS

| | | | | |
|---|---|---|---|---|
| 2006/0285654 | A1* | 12/2006 | Nesvadba | H04N 5/60 379/67.1 |
| 2008/0195386 | A1* | 8/2008 | Proidl | G10L 13/033 704/235 |
| 2008/0235024 | A1* | 9/2008 | Goldberg | G10L 13/00 704/260 |
| 2009/0037179 | A1* | 2/2009 | Liu | G10L 13/08 704/260 |
| 2012/0323575 | A1* | 12/2012 | Gibbon | G11B 27/34 704/246 |
| 2016/0021334 | A1* | 1/2016 | Rossano | G10L 13/033 704/2 |
| 2017/0061978 | A1* | 3/2017 | Wang | G10L 21/0232 |
| 2018/0232363 | A1* | 8/2018 | Jin | G11B 27/031 |
| 2018/0286383 | A1* | 10/2018 | Barari | G06F 40/30 |
| 2020/0058289 | A1* | 2/2020 | Gabryjelski | G10L 17/00 |
| 2020/0213680 | A1* | 7/2020 | Ingel | H04N 21/233 |

OTHER PUBLICATIONS

Lakew, Surafel Melaku, Mattia Di Gangi, and Marcello Federico. "Controlling the output length of neural machine translation." arXiv preprint arXiv:1910.10408 (Oct. 2019). (Year: 2019).*

Soens, Pieter, and Werner Verheist. "Robust temporal alignment of spontaneous and dubbed speech and its application for Automatic Dialogue Replacement." 2010 18th European Signal Processing Conference. IEEE, 2010. (Year: 2010).*

Murray, Kenton, and David Chiang. "Correcting length bias in neural machine translation." arXiv preprint arXiv:1808.10006 (2018). (Year: 2018).*

Lakew, Surafel Melaku, Mattia Di Gangi, and Marcello Federico. "Controlling the output length of neural machine translation." arXiv preprint arXiv:1910.10408 (Oct. 25, 2019). (Year: 2019).*

Andreas, Jansson, et al. "Singing voice separation with deep u-net convolutional networks." 18th International Society for Music Information Retrieval Conference. 2017. (Year: 2017).*

* cited by examiner

| TIMESTAMP 401 | UTTERANCES 403 | TRANSLATED TEXT 404 | SPEAKER 405 |
|---|---|---|---|
| 0:00:10-0:00:13 | MY DOG IS BROWN. | MI PERRO ES MORENO. | SPEAKER 1 |
| 0:00:17-0:00:22 | SOUNDS GOOD TO ME | SUENA BIEN PARA MI. | SPEAKER 2 |
| ... | ... | ... | ... |
| 1:00:00-1:00:01 | OK | OK | SPEAKER 3 |

*FIG. 4*

MULTILINGUAL SPEECH TRANSLATION WITH ADAPTIVE SPEECH SYNTHESIS AND ADAPTIVE PHYSIOGNOMY

BACKGROUND

Multimedia content created and put online is growing at exponential rate, while availability and cost of human skills for subtitling and, especially, for dubbing remains a barrier for its diffusion worldwide. There is still a divide between countries/languages where either subtitling or dubbing are the preferred translation modes, which is mainly caused by economic reasons. Dubbing is in fact a very labor-intensive process, which requires generating translations and utterances that well overlap in content, timing, timbre and emotion with the original version. This work in general requires strong scripting and acting skills. For instance, a sentence uttered in English by an angry young female voice should, ideally, not only sound linguistically adequate in the target language, say French, but also acoustically and emotionally similar to the original.

BRIEF DESCRIPTION OF DRAWINGS

Various embodiments in accordance with the present disclosure will be described with reference to the drawings, in which:

FIG. 4 illustrates an example of segments labeled of speech according to some embodiments.

DETAILED DESCRIPTION

Figure 1:
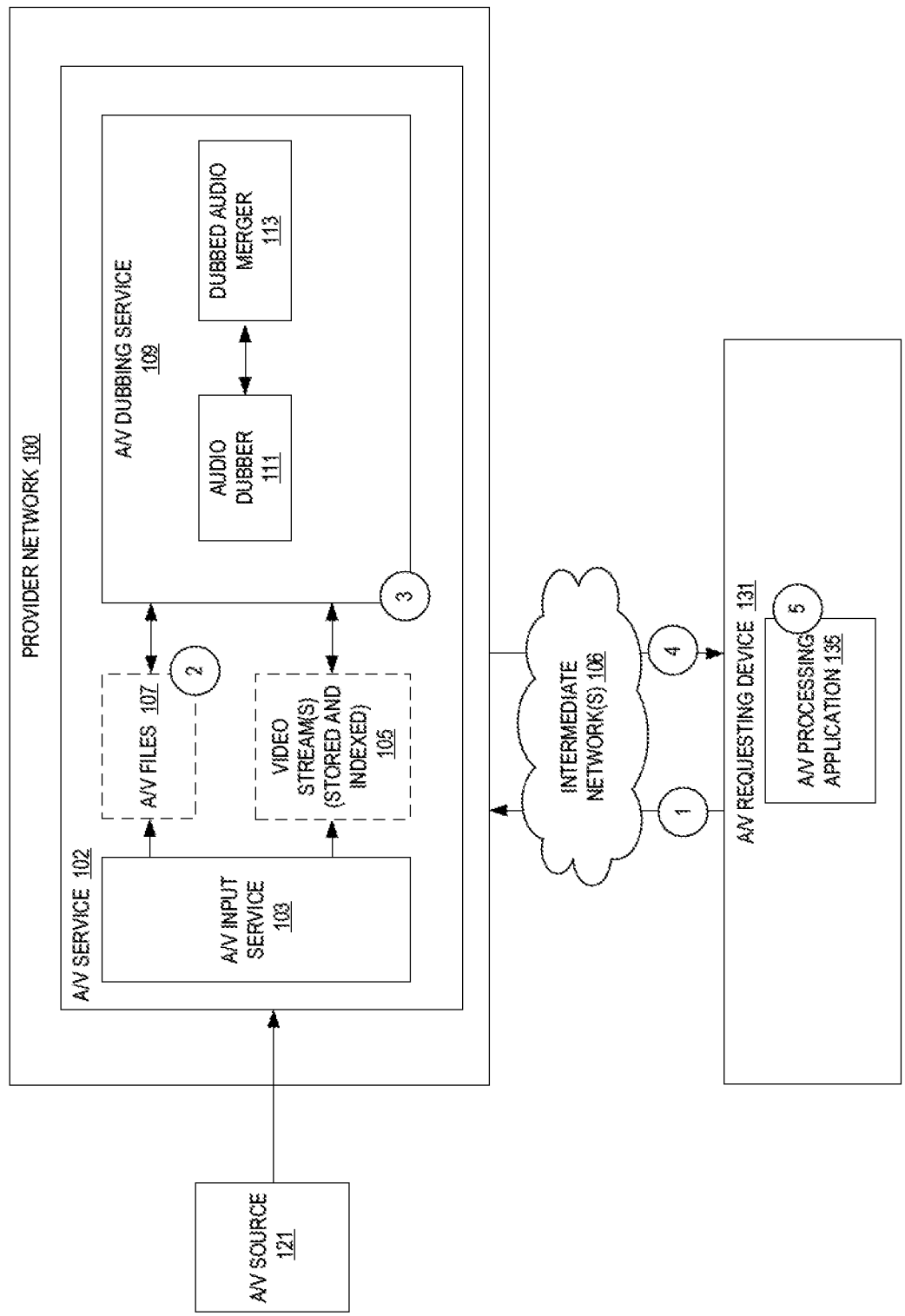
FIG. 1 illustrates embodiments of an audio/video service that allows for dubbing of audio.

The present disclosure relates to methods, apparatus, systems, and non-transitory computer-readable storage media for performing speech dubbing. According to some embodiments, audio from a multimedia file is translated, a spoken version of the translation generated, and then the original spoken parts are replaced with the spoken version of the translations.

Speech dubbing is a more complex task than simple speech translation. For example, assuming an utterance (speech segment) with a given prosody and duration, produced by a given speaker in a specific environment with some background noise, to perform speech translation there are generally three tasks performed and concatenated: automatic speech recognition (ASR), machine translation (MT), and text-to-speech (T2S). As such, speech translation only focuses on the linguistic content of a source utterance, and thus generates a message in the target language that only reflects the content of the original utterance. The output message does not necessarily reflect the same duration, nor is related to the input acoustic conditions.

Speech dubbing goes beyond speech translation, by also trying to generate a target utterance that possibly sounds the same as the original one, i.e. it has a similar timbre, duration, prosody, background noise, and reverberation effects. Being a more complex task, speech dubbing necessitates a more complex architecture which goes beyond the simple pipeline of ASR, MT and T2S. A natural application of speech dubbing is multimedia content. When applied to an audio/video (AV) file, speech dubbing translates its audio track in such a way that speakers of the target language will experience the video in the same way it is experienced by the speakers of the original language.

Speech dubbing targets a non-trivial extension of what is normally referred to as speech translation. While speech translation generally aims at transferring the content of the source utterance into a target string or utterance, speech dubbing also aims at transferring the acoustic, temporal and paralinguistic features of the source utterance. So, while speech translation can be approached by (carefully) concatenating speech recognition, machine translation and speech synthesis, speech dubbing cannot be solved in this way. More precisely, speech dubbing requires to also extract additional information and of different nature from the input signal. This additional information is needed to generate a target speech utterance that reflects as much as possible the original one, in terms of duration, timbre, intensity, pitch, reverberation, noise background, etc. In particular, part of the extracted information should inform the machine translation step (e.g. time duration of the target utterance, visemic information to improve mouth synchronization), the speech synthesis step (e.g., voice model to be used, timing of the output utterance, prosodic information, etc.), and a final acoustic rendering step (e.g., to add the original background noise, reverberation effects, etc.).

Embodiments detailed herein describe a dubbing service that automatically translates the audio of a multimedia file into one or more different language, creates dub speech segments, and mixes the dubbed speech segments with the original audio file. For example, in some embodiments, a workflow for dubbing an audiovisual file using the dubbing service performs one or more of: (i) extracting speech segments from the audio track and annotating these with speaker information; (ii) transcribing the speech segments, (iii) translating the transcript in the target language, (iv) adapting the translation for timing, (v) choosing the voice actors, (vi) performing the dubbing sessions, (vii) fine-aligning the dubbed speech segments, and/or (viii) mixing the new voice tracks within the original audio.

In some embodiments, the video dubbing service supports an application programming interface (API) that allows for a user to provide access to an audio file in a source (first) language and a selection of a target (second) language. The dubbing service detailed herein analyzes the audio track, extracts all speech segments, separates the speech segments from background noise, extracts descriptors of the contained voices, creates "similar" artificial voices (if needed), transcribes the speech segments, translates the transcribed speech segments, "reads" the transcribed speech segments with the artificial voices by matching duration and speaking style, acoustically renders the dubbed speech with the original acoustic environment and, finally, inserts them in the original audio. Once the dubbing process is finished, the translated audio/visual file will be available for download (along with subtitles). As such, the dubbing service generates a translated version of the multimedia file, where the original spoked audio is replaced by naturally sounding speech that is both synchronized and acoustically similar to the original.

Once the content is dubbed and published, the quality of the dubbing can be evaluated through user analytics (for example, a percentage of users watching the dubbed content vs. those switching to the original version). Customers requiring better quality (but still not professional quality) can resort to human post-editing of the subtitles and call the dubbing service to regenerate audio.

FIG. 1 illustrates embodiments of an audio/video service that allows for dubbing of audio. In particular, the A/V service 102 allows for the dubbing of audio provided by a A/V source 121. As shown, the A/V source 121 provides A/V to a A/V service 102.

In some embodiments, the A/V from the A/V source 121 is sent to the A/V input service 103 as a stream of media fragments and metadata describing the stream. In other embodiments, the A/V from the video source 121 is a A/V file (e.g., a MPEG-4 video file).

The A/V input service 103 is an ingestion and storage service which securely ingests, processes, stores, and/or time-based indexes video chunks into A/V streams 105 or A/V files 107. The video input service 103 provides application programming interfaces that allow for the access and retrieval of indexed video fragments and/or A/V files 107. Each chunk consists of a media fragment from the A/V source, a copy of media metadata sent by the producer, and the specific metadata for that chunk such as the fragment number, and server-side and producer-side timestamps as pre- or post-metadata.

The A/V dubbing service 109 dubs at least a proper subset of the audio of the A/V files 107 and/or A/V streams 105. In some embodiments, an audio dubber 111 of the A/V dubbing service 109 performs a plurality of tasks as described below. For example, the A/V dubbing service 109 partitions an input audio track into speech and non-speech segments. The speech segments may then be processed to separate speech from possible background noise. Note that A/V files is used below, but the techniques detailed are applicable to A/V streams.

In some embodiments, speech segments are then labelled with speaker labels by the A/V dubbing service 109. Each speaker utterance is then transcribed into a sequence of words including punctuation and time stamps (to generate a transcript). Note that the labeling and transcription discussed as being performed the A/V dubbing service 109 above, come from closed captioning or subtitle tracks provided with the A/V file.

In some embodiments, the A/V dubbing service 109 uses the utterances of the same speaker to create a machine learning (ML) speaker model for the corresponding speaker, while utterances and their transcripts may be used to prosodically align the transcript. Note again, that some of this work may have been previously done. Should a ML speaker model already exist for a particular voice, the A/V dubbing service 109 may just identify the proper ML speaker model based on the labeling.

The A/V dubbing service 109 generates a spoken version of the prosodically aligned transcript using a determined ML speaker model g. A rendering step may be applied which adds to the clean signal the reverberation and background noise present in the original utterance. The resulting new speech segments are composed with the original non-speech segments to create the output audio track. The dubbed audio merger 113 then merges the output audio track with the video.

In some embodiments, extracted visual information from the A/V filed is used for one or more of to: to create and use speaker models that are consistent with the visual; model prosody that is consistent with the visual; and/or force or relax timing constraints to machine translation, depending on how well the speaker is visible.

As shown, the A/V service 102 is a part of a provider network 100 (or, "cloud" provider network) that provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The A/V requesting device 131 includes a A/V processing application 135 (e.g., a multimedia player) to provide an audio output using the dubbed content of the A/V file generated by the A/V dubbing service 109.

The circles with numbers inside indicate an exemplary flow. At circle 1, the video requesting device 131 requests a A/V file with dubbed content.

The A/V dubbing service 109 receives the A/V file (or at least the audio track thereof) at circle 2. The A/V dubbing service 109 the processes the audio track of the A/V file to replace existing speech with translated audio having similar audio characteristics including length and prosody.

The A/V file with the dubbed audio track is provided to the A/V requesting device 131 at circle 4. At circle 5, the A/V processing application 135 of the A/V requesting device 131 plays the A/V file with the dubbed audio track.

Figure 2:
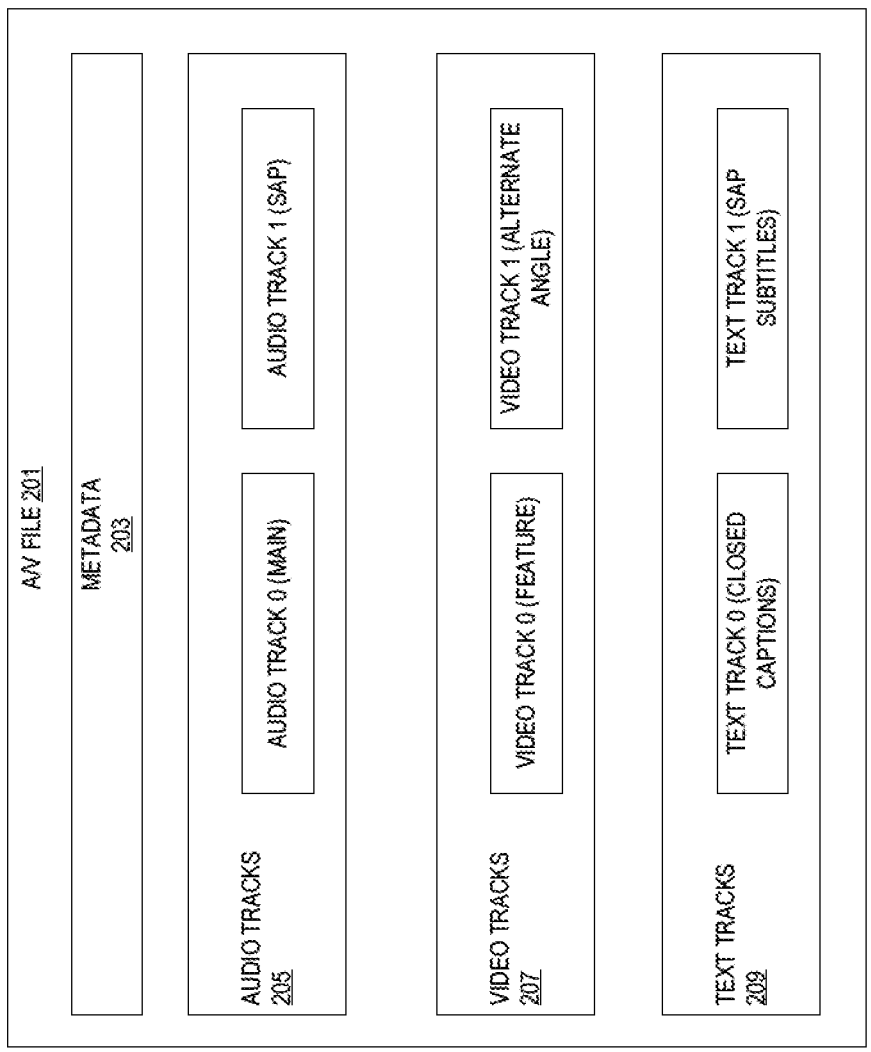
FIG. 2 illustrates an example of the content of an audio/visual file that can have its audio track dubbed into a different language according to some embodiments.

FIG. 2 illustrates an example of the content of an audio/visual file that can have its audio track dubbed into a different language according to some embodiments. In some embodiments, the A/V file 201 is a container such as a Matroska Multimedia Container, a MPEG-based container, WebM container, etc.

Metadata 203 of the A/V file 201 describes the media (audio and video), what codecs are used, etc. One or more audio tracks 205 provide the audio for the A/V content. As shown, in some instances there may be a "main" track (the default track for example) and a secondary track (typically audio in a different language than the default track). The secondary track is normally performed by other actors and does not have a similar prosodic feel to the main track.

Audio tracks 205 may be encoded in a variety of formats including, but not limited to: WAV, MP3, MP2, AC3, AAC, Vorbis, Opus, etc.

One or more video tracks 207 provide the video for the A/V content. As shown, in some instances there may be a "feature" track (the default track for example) and a secondary track (typically video in alternate angles than the default track). Video tracks 207 may be encoded in a variety of formats including, but not limited to: H.264/MPEG-4, MPEG-2, H.265, VP8, VP9, AV1

Text tracks 209 provide closed captioning and/or subtitles. Note that this is exemplary and not all of the components are readily available. For example, text tracks 209 that provide closed captioning or subtitles are more typically associated with commercially produced content. For content that has been generated by a typical home user (e.g., recording on a smart phone, etc.) it is not at all uncommon to find that neither present.

Figure 3:
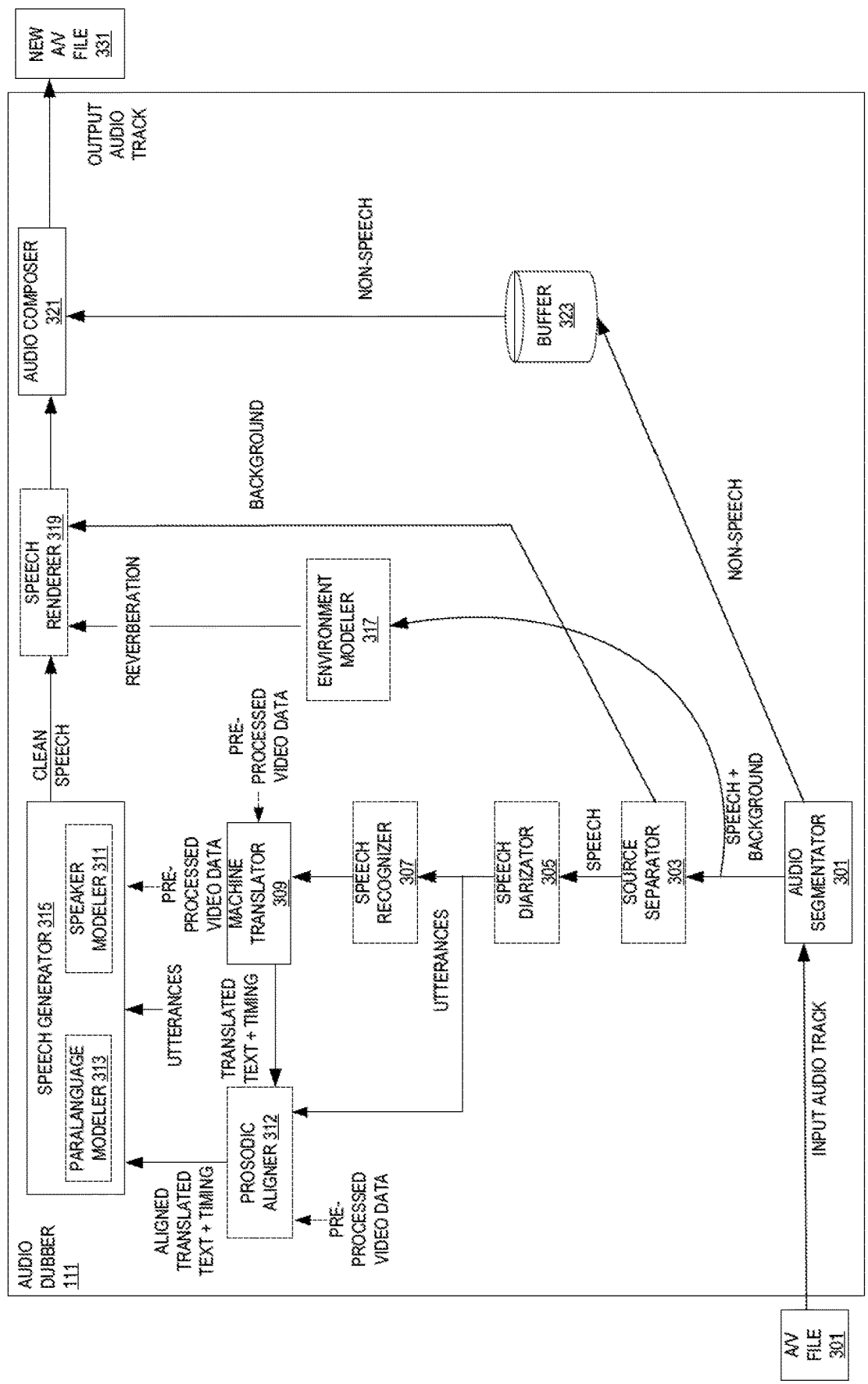
FIG. 3 illustrates embodiments of an A/V dubbing service.

FIG. 3 illustrates aspects of embodiments of an A/V dubbing service. In particular, what is illustrated include exemplary embodiments of the audio dubber 111 of the A/V dubbing service 109. As noted above, this service may work on commercially produced content or other content. As such, some aspects of the service may not be needed depending upon the content. For example, if the captioning text includes an identifier of a speaker, it may not be necessary to perform speech diarization. Additionally, the components shown as being a part of the A/V dubbing service 109 may be services that the A/V dubbing service 109 calls and consumes the output. For example, the A/V dubbing service 109 may call an audio segmentator service instead of an audio segmentator 301 that is self-contained.

An input audio track of an A/V file 301 is received by an audio segmentator 301 which extracts speech segments from an audio file. An audio track may have more than just speech such as music, etc. and this component buffers the non-speech into buffer 323 to be used in the generation of the dubbed output track (the merging of the dubbed content with the background noise, music, etc.). In some embodiments, the audio segmentator 301 is a ML model.

In some embodiments, a source separator 303 separates speech from background noise. This allows for a cleaner speech signal which however could contain some artifacts in the spectrum and a background speech signal which can be used to recognize or model the background noise that we want to reproduce in the dubbed voice. When the background is added to the dubbed speech it may make it sound more real and similar to the original. In some embodiments, the source separator 303 a ML model having a series of down-sampling blocks, followed by a bottom convolutional layer, followed by a series of up-sampling blocks with skip connections from the down-sampling to the up-sampling blocks. Because of the down-sampling blocks, the ML model can compute a number of high-level features on coarser time scales, which are concatenated with the local, high-resolution features computed from the same-level up-sampling block. This concatenation results into multi-scale features for prediction. The model operates on a time-frequency representation (spectrograms) of the audio mixture and outputs two soft ratio masks corresponding to foreground and background, respectively, which are multiplied element-wise with the mixed spectrogram, to obtain the final estimates of the two sources. Finally, the estimated spectrograms go through an inverse short-term Fourier transform block to produce raw time domain signals.

A speaker diarizator 305 identifies speech segments belonging to the same speaker and generates utterances to be labeled. Note that in some embodiments, the speech segments are labeled as a part of the text data of the A/V file and diarization may not be needed.

A speech recognizer 307 receives the utterances and transcribes them into a sequence of words including timing, punctuation and casing information.

In some embodiments, the audio segmentator 301, source separator 303, speech diarizator 305, and speech recognizer 307 are a part of automatic speech recognition (ASR) service. An ASR engine of the service passes the audio through an acoustic model to break the audio file into a series of words. In some embodiments, models may include one or more language models and an acoustic model. Some of these series of words may represent sentences, some may not be intelligible. To further refine this output, it can be passed through a language model (LM). The LM includes grammar rules, language constructs, and other language-specific nuances. In some embodiments, the LM can include a custom glossary that includes jargon or other domain specific words or phrases. The LM analyzes the input and determines whether the series of words makes sense in the language of the LM. For example, the output includes a plurality of hypotheses associated with each resulting sentence (or series of words). The hypotheses include a confidence value indicating how likely the ASR engine believes the sentence to be correctly transcribed. In some embodiments, when the audio file includes multiple speakers, each speaker's portion can be tagged with the speaker. Each speaker's tagged audio can then be processed by ASR engine, and then the result is punctuated and normalized.

Normalization may include determine the formatting of language (e.g., determine whether "eleven fifteen" should be represented as 11:15, 11/15, eleven fifteen, etc. depending on context).

In some embodiments, a prosodic aligner 312 temporally aligns the machine translator 309 output with the speech segments of the original audio. As such, the takes prosodic aligner 312 in the utterances (or text from a text file) and translated text (including timing) to match the distribution of words and pauses to generate prosodically aligned translated text and timing (such as splits, etc.). In some embodiments, pre-processed video information is also provided to the prosodic aligner 312 to use in this alignment. In particular indications of when a face or mouth is not visible and therefore the prosodic alignment may be relaxed.

The utterances may also be used by a speaker modeler 311 which extracts speaker information from the utterances of the same speaker to create or select a corresponding target speaker. This task can be approached by selecting inside an available inventory the model that best matches the original speaker (e.g., classifying the speaker using a classification machine learning model), or by creating an ad-hoc model that mimics the timbre of the original speaker. The speaker modeler 311 may also utilize information from the video to determine a speaker (e.g., if the speaker was identified using facial recognition). An output of this modeler 311 may include some prosodic information such as timbre.

The utterances may also be used by a ML-based paralanguage modeler 313 to extract paralinguistic information (e.g. accent, pitch, volume, speech rate, modulation, and fluency) from the source utterances and prosodically aligned text and timing information to use to reproduce an equivalent or at least credible target utterance. In some embodiments, the paralanguage modeler 313 utilizes video to create and use speaker models that are consistent with the visual; model prosody that is consistent with the visual A ML-based environment modeler 317 extracts acoustic-response information (reverberation information) of the environment from the speech and background exported from the audio segmentator 301, so that it can be re-inserted in the target speech. Text and timing information from the speech recognizer 307 may also be used by this modeler.

A ML-based machine translator 309 translates the transcribed speech utterance into an equivalent target utterance. In some embodiments, this machine translation is performed using neural machine translation which as a form of language translation automation that uses deep learning models to deliver more accurate and more natural sounding translation than traditional statistical and rule-based translation algorithms. In some embodiments, translations take into account the timing of the source by: i) conditioning the output to a given target-source length-ratio class (e.g., character length); ii) enriching a positional embedding with length information; or iii) a combination of i and ii. Specifically, the translation should reflect as much as possible the duration of the source utterance as well as the duration of word groups inside it that are delimited by pauses. In this way, generated speech can be properly aligned with the original one and will match the visual mouth movement in the video.

In some embodiments, the length of machine translator's 309 output is inspired by target forcing in multilingual neural machine translation. In particular, the machine translator's 309 training sentence pairs are split into three groups (short, normal, and long) according to the target/source string-length ratio. In practice, we select two thresholds $t_1$ and $t_2$, and partition training data according to the length-ratio intervals $[0, t_1)$, $[t_1, t_2.)$, and $[t_2, \text{inf})$. At training time a length token is prepended to each source sentence according to its group, in order to let the neural machine translator's 309 model discriminate between the groups. At inference time, the length token is instead prepended to bias the model to generate a translation of the desired length type.

A speech generator 315 creates a speech signal that reproduces a given sentence with a specified timbre and prosody for text by attempting to match a specified time interval as provided by the machine translator. In particular, the speech generator 315 uses a ML speaker model corresponding to a speaker of each segment. The ML speaker model is selected based on the speaker label and then fed the prosody, text, and timing information for a corresponding segment to create a speech signal.

An environmental modeler 317 estimate the environment reverberation from the original audio. Unfortunately, estimating the room impulse response (RIR) from a reverberated signal requires solving an ill-posed blind deconvolution problem. In some embodiments, a blind estimation of the reverberation time (RT) is made which is commonly used to assess the amount of room reverberation or its effects. The RT is defined as the time interval in which the energy of a steady-state sound field decays 60 dB below its initial level after switching off the excitation source. In particular, a Maximum Likelihood Estimation (MLE) based RT estimate is found. In some embodiments, the estimated RT used to generate a synthetic RIR using a RIR generator.

In some embodiments, the speech signal is subjected to a speech renderer 319 to re-introduce background noise and environmental reverberation in the generated speech signal. In particular, one or more of the synthetic RIR and/or background noise are applied to the clean speech audio.

An audio composer 321 assembles a new audio track from the original non-speech segments and the newly generated speech segments which is associated with the video of the original A/V file 301 to generate a new A/V file 331. This association may include replacing the original soundtrack in a container.

FIG. 4 illustrates an example of segments labeled of speech according to some embodiments. The combination of items could be used by a speech generator such as speech generator 315. As shown, each labeled speech segment includes a timestamp 401, utterances 403, translated text 404, a speaker identifier 405.

The timestamp 401 provides a location in the overall audio track of where a speech segment occurred and its length. This length may be used to determine a length of translated text. The utterances 403 is the speech from the original audio. This may be determined using a ML-based approach or pulled from a text file.

Translated text 403 is the output of the machine translator 309. The translation may be based on the utterances 403, text pulled from a text file, or come from secondary text (e.g., subtitles).

The speaker 405 may be found, in some instances, in closed captioning, and in other instances is inferred by the speaker modeler 311. A corresponding speaker model 407 is identified. The speaker model may be for a particular speaker (e.g., a celebrity) or a generic model tuned to have similar prosody.

Figure 5:
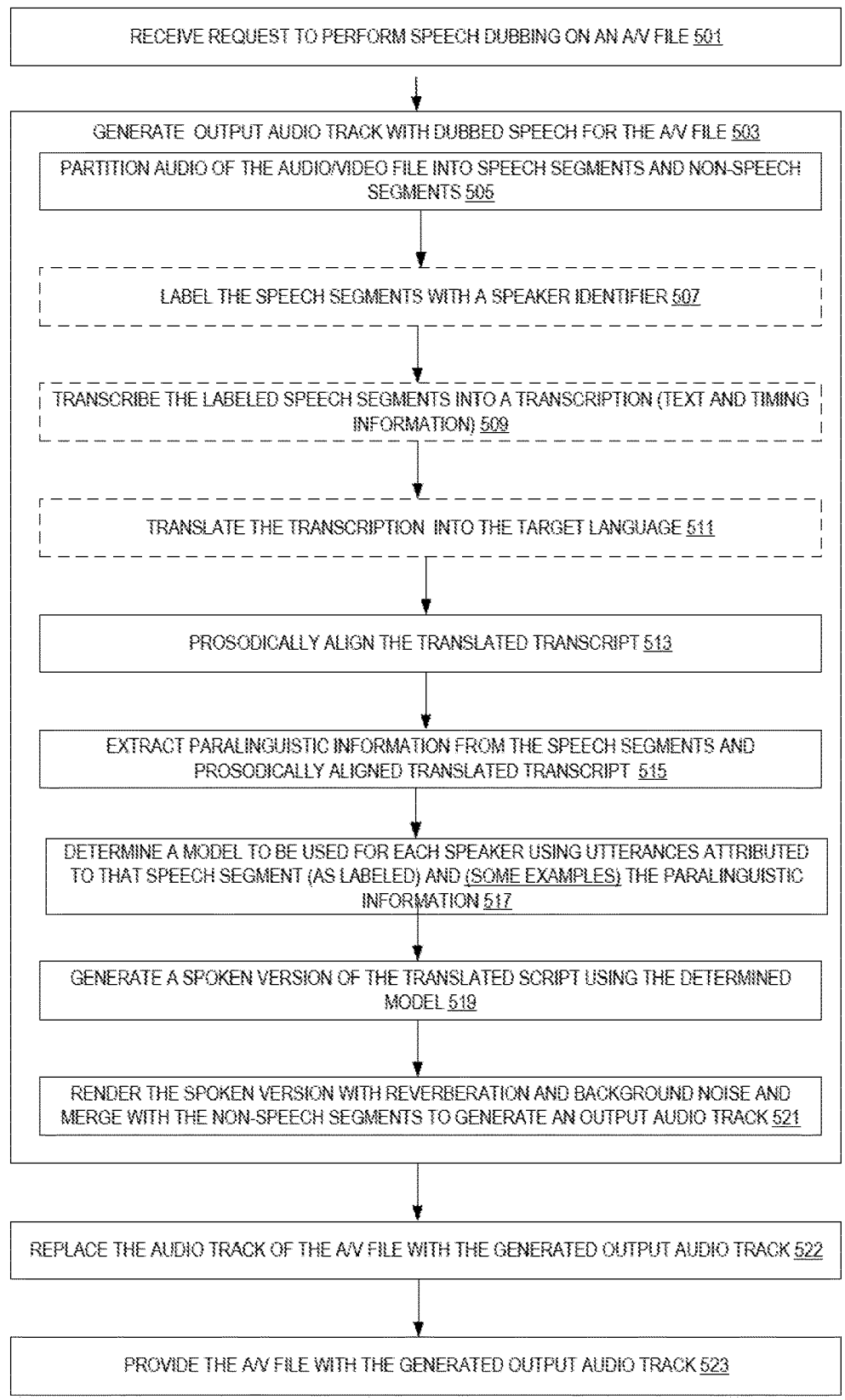
FIG. 5 is a flow diagram illustrating operations of a method for dubbing speech in an A/V file according to some embodiments.

FIG. 5 is a flow diagram illustrating operations of a method for dubbing speech in an A/V file according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures such as those of the A/V dubbing service 109.

At 501, a request to perform speech dubbing on an A/V file is received. The request may include a location of the source A/V file, the source A/V file itself, an indication of the source language, an indication of the target language, etc.

An audio track with dubbed speech is generated for the A/V file according to the request at 503. This generation may include one or more activities.

In some embodiments, the audio of the audio/video file is partitioned into speech segments (utterances) and non-speech segments at 505. Non-speech segments include periods without speech, music that was in a scene with speech, etc. The speech segments include an indication of the duration of time per segment. Additionally, background noise may be removed from speech segments.

In some embodiments, the speech segments are labeled with a speaker identifier at 507. This labeling may be performed using ASR techniques such as those detailed above. Note that if the speech segments are already labeled as a part of closed captioning, etc. then this activity is not performed.

In some embodiments, the labeled speech segments are transcribed into a transcription at 509. Typically, this transcription uses ASR techniques and includes outputting text and timing information.

The transcript is translated into the target language at 511. In some embodiments, the translation takes into account the length of the source speech segment such that the translation has nearly or equal length.

At 513, the translated transcript is prosodically aligned as detailed above.

Paralinguistic information is extracted from the speech segments, transcript, and/or prosodically aligned translated transcript at 515. In some embodiments, information from the video is used in the generation of prosody information as noted above.

A ML model to use per speaker in the transcript is determined at 517. In some embodiments, a ML model is trained using utterances attributed to a particular speaker such that the ML model will generate speech with similar timbre as the speaker. In other embodiments, a ML model to be used is determined based on the identity of the speaker (e.g., an existing trained model for a celebrity). In some embodiments, information from the video is used in this ML model determination as noted above.

A spoken version of the translated text is generated at 519 by using at least the prosodically aligned translated transcript. This activity generates spoken versions for each speech segment using the proper corresponding speaker ML model.

At 519, the spoken version of the prosodically aligned translated transcript is merged with the previously extracted non-speech segments to generate an output audio track. In some embodiments, reverberation and background noise are also added.

The audio track of the A/V file is replaced with the with the generated output audio track at 522 and this modified A/V file is provided to the requester at 523 for playback and/or analysis.

Figure 6:
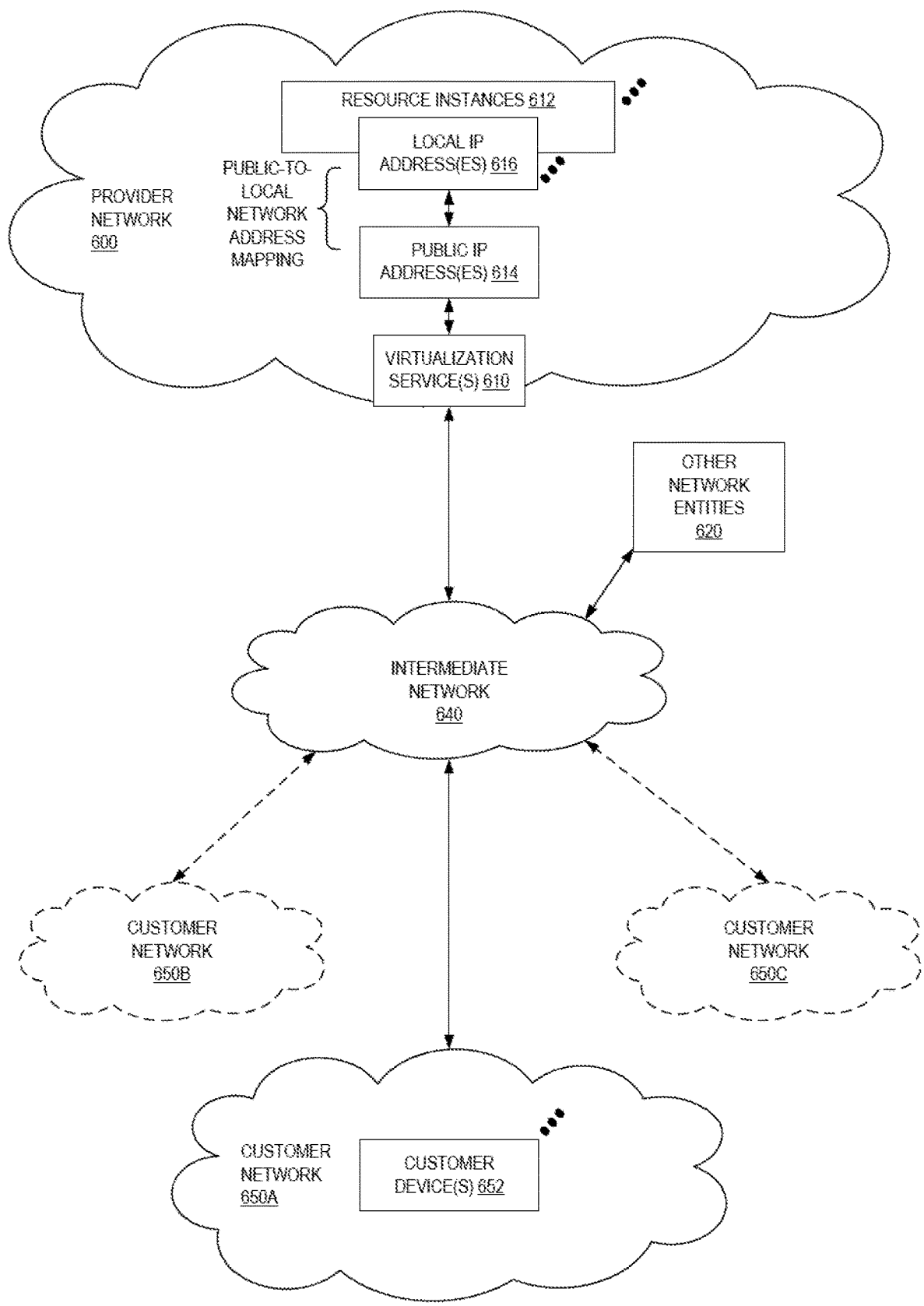
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
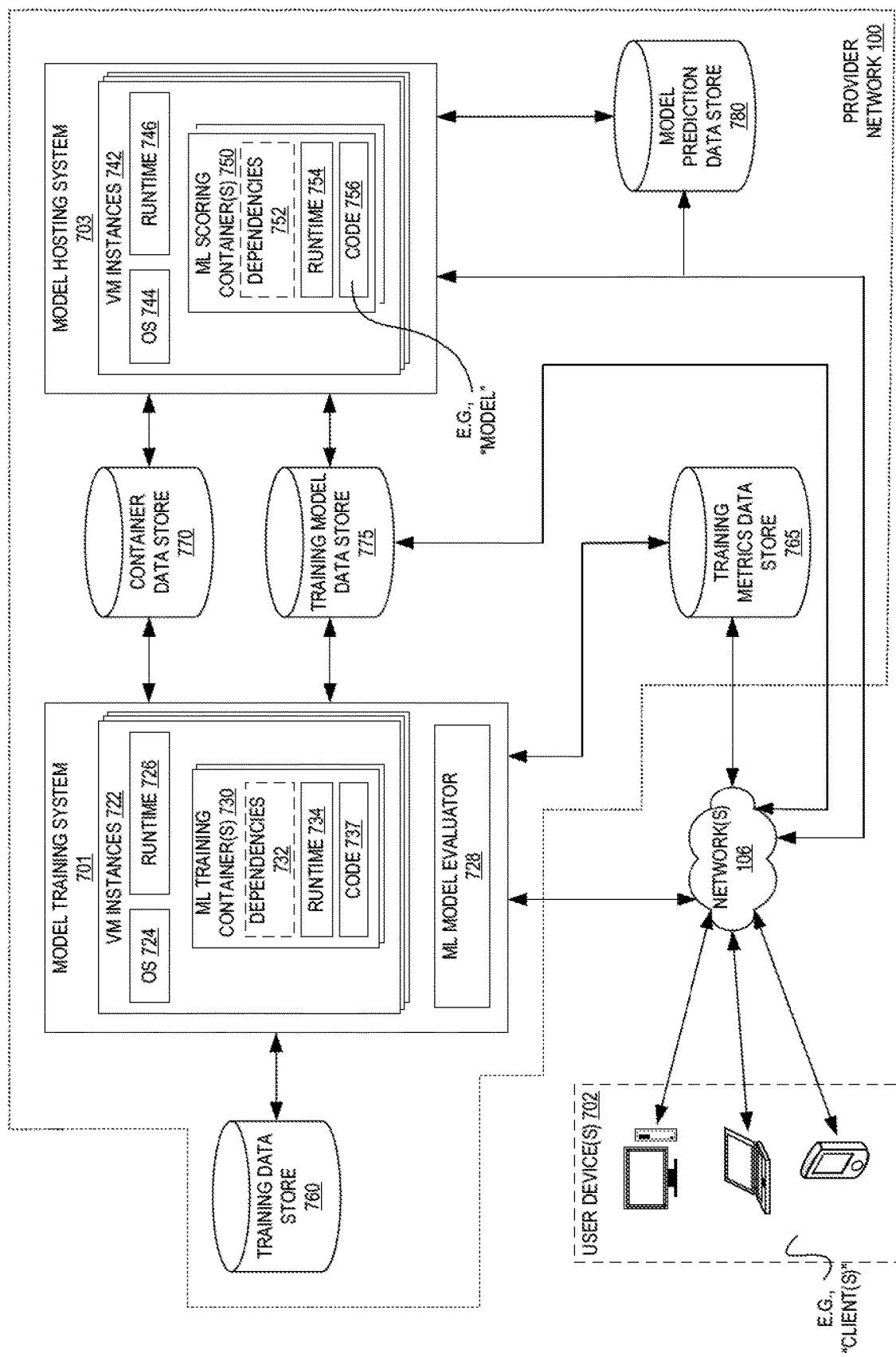
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s) 702), a model training system 701, a model hosting system 703, a training data store 760, a training metrics data store 765, a container data store 770, a training model data store 775, and a model prediction data store 780.

In some embodiments, users, by way of user devices 702, interact with the model training system 701 to provide data that causes the model training system 701 to train one or more machine learning models, for example, as described elsewhere herein. A machine learning model, generally, may be thought of as one or more equations that are "trained" using a set of data. In some embodiments, the model training system 701 provides ML functionalities as a web service, and thus messaging between user devices 702 and the model training system 701 (or provider network 100), and/or between components of the model training system 701 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 701 via frontend 729 of the model training system 701. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 701 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 701, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 701 can retrieve the container image from the indicated location and create a container using the retrieved container image. The container is then loaded into a virtual machine instance 722 for training a machine learning model, as described in greater detail below.

The model training system 701 can use the information provided by the user device 702 to train a machine learning model in one or more pre-established virtual machine instances 722 in some embodiments. In particular, the model training system 701 includes a single physical computing device or multiple physical computing devices that are interconnected using one or more computing networks (not shown), where the physical computing device(s) host one or more virtual machine instances 722. The model training system 701 can handle the acquisition and configuration of compute capacity (for example, containers, instances, etc., which are described in greater detail below) based on the information describing the computing machine on which to train a machine learning model provided by the user device 702. The model training system 701 can then train machine learning models using the compute capacity, as is described in greater detail below. The model training system 701 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 701 uses one or more container images included in a training request (or a container image retrieved from the container data store 770 in response to a received training request) to create and initialize a ML training container 730 in a virtual machine instance 722. For example, the model training system 701 creates a ML training container 730 that includes the container image(s) and/or a top container layer.

Prior to beginning the training process, in some embodiments, the model training system 701 retrieves training data from the location indicated in the training request. For example, the location indicated in the training request can be a location in the training data store 760. Thus, the model training system 701 retrieves the training data from the indicated location in the training data store 760. In some embodiments, the model training system 701 does not retrieve the training data prior to beginning the training process. Rather, the model training system 701 streams the training data from the indicated location during the training process. For example, the model training system 701 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 701 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 701 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 701 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 701 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 701 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 701 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 701 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 701 can significantly reduce the training time in some embodiments.

In some embodiments, the model training system 701 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 701 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 701 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 701 can modify the machine learning model accordingly. For example, the model training system 701 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 701 can cause the virtual machine instance 722 to modify the execution of code stored in an existing ML training container 730 according to the data provided in the modification request. In some embodiments, the user, via the user device 702, can transmit a request to the model training system 701 to stop the machine learning model training process. The model training system 701 can then instruct the virtual machine instance 722 to delete the ML training container 730 and/or to delete any model data stored in the training model data store 775.

As described below, in some embodiments, the model data stored in the training model data store 775 is used by the model hosting system 703 to deploy machine learning models. Alternatively, or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 701 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 703, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 703 includes a single physical computing device or multiple physical computing devices that are interconnected using one or more computing networks (not shown), where the physical computing device(s) host one or more virtual machine instances 742. The model hosting system 703 can handle the acquisition and configuration of compute capacity (for example, containers, instances, etc.) based on demand for the execution of trained machine learning models. The model hosting system 703 can then execute machine learning models using the compute capacity, as is described in greater detail below. The model hosting system 703 can automatically scale up and down based on the volume of execution requests received from user devices 702 via frontend 749 of the model hosting system 703, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 703 uses one or more container images included in a deployment request (or a container image retrieved from the container data store 770 in response to a received deployment request) to create and initialize a ML scoring container 750 in a virtual machine instance 742. For example, the model hosting system 703 creates a ML scoring container 750 that includes the container image(s) and/or a top container layer.

As described above, a user device 702 can submit a deployment request and/or an execution request to the model hosting system 703 via the frontend 749 in some embodiments. A deployment request causes the model hosting system 703 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 703 initializes ones or more ML scoring containers 750 in one or more hosted virtual machine instance 742. In embodiments in which the deployment request includes an identification of one or more container images, the model hosting system 703 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 703 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 703 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 703 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 703 unarchives or decompresses the model data file to obtain multiple individual files and inserts the individual files into the ML scoring container 750. In some embodiments, the model hosting system 703 stores the model data file in the same location as the location in which the model data file was stored in the ML training container 730 that generated the model data file. For example, the model data file initially was stored in the top container layer of the ML training container 730 at a certain offset, and the model hosting system 703 then stores the model data file in the top container layer of the ML scoring container 750 at the same offset.

In embodiments in which multiple model data files are identified in the deployment request, the model hosting system 703 retrieves the identified model data files from the training model data store 775. The model hosting system 703 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 703 associates the initialized ML scoring container(s) 750 with the endpoint identified in the deployment request. For example, each of the initialized ML scoring container(s) 750 can be associated with a network address. The model hosting system 703 can map the network address(es) to the identified endpoint, and the model hosting system 703 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 703 via the frontend 749, where the execution request identifies an endpoint and includes an input to a machine learning model (for example, a set of input data). The model hosting system 703 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 703 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively, or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 703 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 701, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 701 and the model hosting system 703 depicted in FIG. 7 are not meant to be limiting. For example, the model training system 701 and/or the model hosting system 703 could also operate within a computing environment having a fewer or greater number of devices than are illustrated in FIG. 7. Thus, the depiction of the model training system 701 and/or the model hosting system 703 in FIG. 7 may be taken as illustrative and not limiting to the present disclosure. For example, the model training system 701 and/or the model hosting system 703 or various constituents thereof could implement various web services components, hosted or "cloud" computing environments, and/or peer-to-peer network configurations to implement at least a portion of the processes described herein. In some embodiments, the model training system 701 and/or the model hosting system 703 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 701. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 703. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 701 and the model hosting system 703, this is not meant to be limiting. For example, in some embodiments not shown, the training data store 760 is located internal to at least one of the model training system 701 or the model hosting system 703.

In some embodiments, the training metrics data store 765 stores model metrics. While the training metrics data store 765 is depicted as being located external to the model training system 701 and the model hosting system 703, this is not meant to be limiting. For example, in some embodiments not shown, the training metrics data store 765 is located internal to at least one of the model training system 701 or the model hosting system 703.

The container data store 770 stores container images, such as container images used to form ML training containers 730 and/or ML scoring containers 750, that can be retrieved by various virtual machine instances 722 and/or 742. While the container data store 770 is depicted as being located external to the model training system 701 and the model hosting system 703, this is not meant to be limiting. For example, in some embodiments not shown, the container data store 770 is located internal to at least one of the model training system 701 and the model hosting system 703.

The training model data store 775 stores model data files. In some embodiments, some of the model data files are comprised of a single file, while other model data files are packages of multiple individual files. While the training model data store 775 is depicted as being located external to the model training system 701 and the model hosting system 703, this is not meant to be limiting. For example, in some embodiments not shown, the training model data store 775 is located internal to at least one of the model training system 701 or the model hosting system 703.

The model prediction data store 780 stores outputs (for example, execution results) generated by the ML scoring containers 750 in some embodiments. While the model prediction data store 780 is depicted as being located external to the model training system 701 and the model hosting system 703, this is not meant to be limiting. For example, in some embodiments not shown, the model prediction data store 780 is located internal to at least one of the model training system 701 and the model hosting system 703.

While the model training system 701, the model hosting system 703, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 701 and/or the model hosting system 703 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 701 and/or the model hosting system 703 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
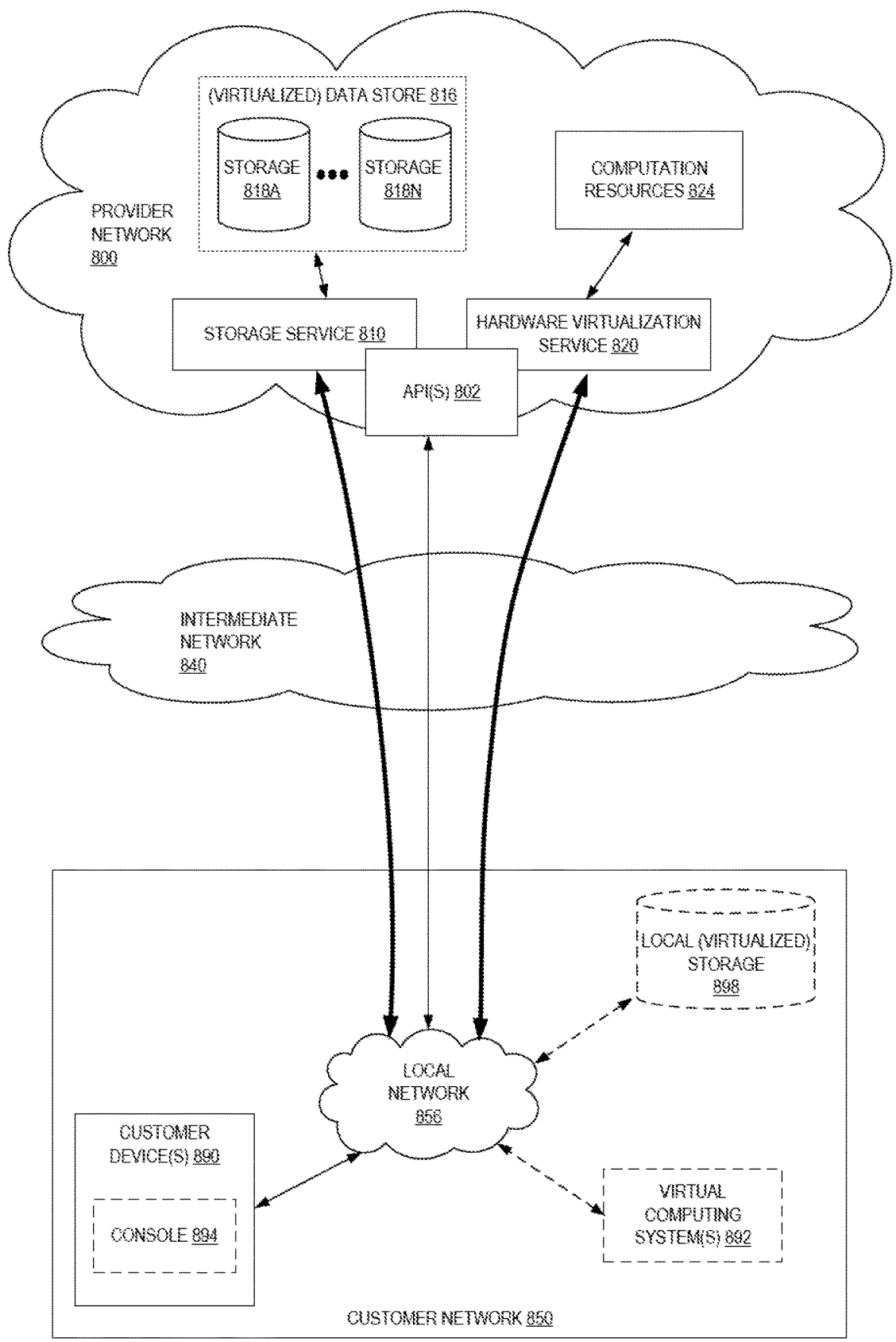
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
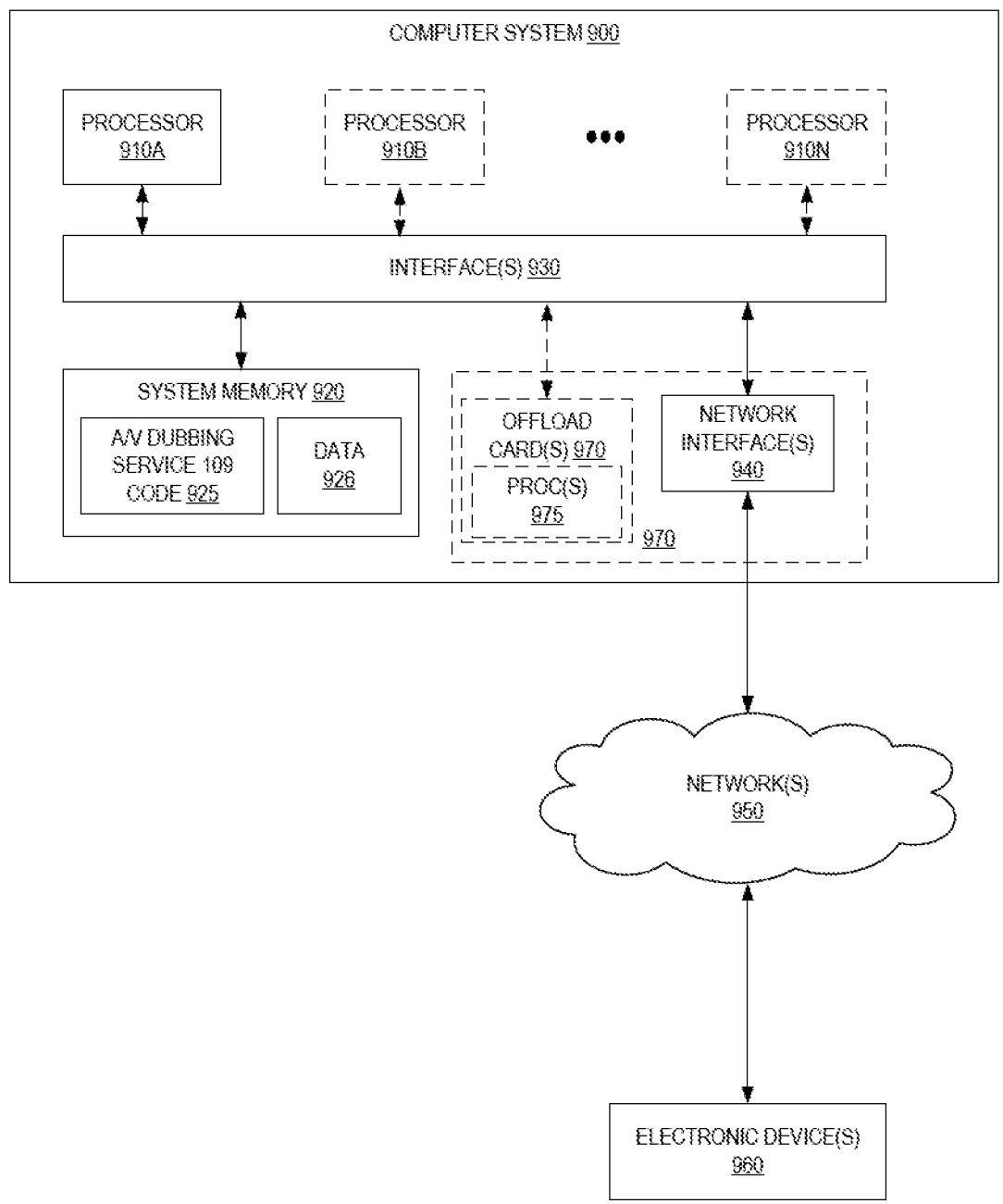
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as A/V dubbing service 109 code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request, sent by a requester, to generate dubbed speech for an audio/visual file; and
   in response to the request,
      using a machine learning model to speech from background noise in audio of an audio track of the audio/visual file,
      extracting speech segments from the audio track of the audio/visual file and annotating the speech segments with a plurality of speaker identifiers,
      transcribing the extracted speech segments into a transcript containing text and timing information,
      using an artificial neural machine translation model to machine translate the transcript into a target language, wherein using the artificial neural machine translation model to machine translate the transcript into the target language comprises biasing the artificial neural machine translation model to generate text segments in the target language of desired lengths for inclusion in the translated transcript,
      prosodically aligning the translated transcript, the translated transcript comprising the generated text segments in the target language of desired lengths,
      extracting paralinguistic information from the extracted speech segments and the prosodically aligned translated transcript,
      determining, based upon the extracted speech segments and paralinguistic information, a plurality of trained machine learning models to use for the plurality of identified speakers, wherein, for each identified speaker of the plurality of identified speakers, a different respective one of the plurality of trained machine learning models is determined for the identified speaker, generating a spoken version of the prosodically aligned translated transcript using the plurality of trained machine learning models determined for the plurality of identified speakers, wherein, for each identified speaker of the plurality of identified speakers, the respective trained machine learning model determined for the identified speaker is used to generate speech segments corresponding to the identified speaker for inclusion in the spoken version of the prosodically aligned translated transcript, incorporating the background noise into the spoken version of the prosodically aligned translated transcript, generating a modified audio track by replacing the extracted speech segments from the audio track of the audio/visual file with the spoken version of the prosodically aligned translated transcript, and providing the audio/visual file with the modified audio track to the requester.

2. The computer-implemented method of claim 1, wherein the paralinguistic information includes at least one of timbre, pitch, length of sounds, and loudness.

3. The computer-implemented method of claim 1, wherein the extracted speech segments are annotated with a length and the machine translating is to generate translated, extracted speech segments of similar length.

4. A computer-implemented method comprising:
receiving a request, sent by a requester, to generate dubbed speech for an audio/visual file; and
in response to the request,
using a machine learning model to separate speech from background noise in audio of an audio track of the audio/visual file,
using an artificial neural machine translation model to machine translate speech segments of the audio track of the audio/visual file into a target language to generate a translated transcript, wherein using the artificial neural machine translation model to translate the speech segments comprises biasing the artificial neural machine translation model to generate text segments in the target language of desired lengths for inclusion in the translated transcript,
prosodically aligning the translated transcript,
determining, based upon the speech segments, a plurality of trained machine learning models for a plurality of identified speakers of the audio track, wherein, for each identified speaker of the plurality of identified speakers, a different respective one of plurality of trained machine learning models is determined for the identified speaker,
generating a spoken version of the prosodically aligned translated transcript using the plurality of trained machine learning models determined for the plurality of identified speakers, wherein, for each identified speaker of the plurality of identified speakers, the respective trained machine learning model determined for the identified speaker is used to generate speech segments corresponding to the identified speaker for inclusion in the spoken version of the prosodically aligned translated transcript,
incorporating the background noise into the spoken version of the prosodically aligned translated transcript,
generating a modified audio track by replacing the speech segments from the audio track of the audio/visual file with the generated spoken version of the prosodically aligned translated transcript to generate a modified audio track, and
providing the audio/visual file with the modified audio track to the requester.

5. The computer-implemented method of claim 4, further comprising:
extracting the speech segments from an audio track of the audio/visual file and annotating the speech segments with a speaker identifier.

6. The computer-implemented method of claim 4, further comprising:
extracting corresponding text for the speech segments from captioning data of the audio/visual file prior.

7. The computer-implemented method of claim 4, wherein the speech segments are annotated with a length and the machine translating is to generate translated speech segments of similar length.

8. The computer-implemented method of claim 4, wherein determining a machine learning model per speaker of the audio track comprises:
training a machine learning model per speaker based at least in part on utterances.

9. The computer-implemented method of claim 4, wherein determining a machine learning model per speaker comprises:
identifying an existing machine learning model per speaker based on identification of the speaker.

10. The computer-implemented method of claim 9, wherein identifying an existing machine learning model per identified speaker comprises:
utilizing facial information from a video portion of the audio/visual file to detect the speaker; and
querying for the existing machine learning model corresponding to the detected speaker.

11. The computer-implemented method of claim 4, wherein prosodically aligning the translated transcript includes using facial information from a video portion of the audio/visual file to determine if the speaker's face or mouth is visible.

12. The computer-implemented method of claim 4, further comprising:
extracting paralinguistic information from the speech segments and prosodically aligned translated transcript.

13. The computer-implemented method of claim 4, wherein the audio/visual file is a container.

14. A system comprising:
storage for an audio/video file; and
one or more electronic devices to implement a dubbing service, the dubbing service including instructions that upon execution cause the dubbing service to:
receive a request, sent by a requester, to generate dubbed speech for an audio/visual file; and
in response to the request to,
separate speech from background or non-speech noise in audio of an audio track of the audio/visual file using a machine learning model,
extract speech segments from the audio track of the audio/visual file associated with a plurality of identified speakers,
use an artificial neural machine translation model to machine translate the extracted speech segments into a target language including biasing the artificial neural machine translation model to generate text segments in the the target language of desired lengths for inclusion in the translated, extracted speech segments, determine, for each identifier speaker of the plurality of identified speakers, a different respective one of a plurality of trained machine learning models, generated a spoken version of the translated, extracted speech segments using prosody information for the extracted speech segments including using, for each identified speaker of the plurality of identified speakers, the respective trained machine learning model determined for the identified speaker to generate speech segments corresponding to the identified speaker for inclusion in the spoken version of the translated, extracted speech segments, incorporate the background or non-speech noise into the spoken version of the translated, extracted speech segments, replace the extracted speech segments from the audio track of the audio/visual file with the spoken version of the translated, extracted speech segments to generate a modified audio track, and provide the audio/visual file with the modified audio track to the requester.

15. The system of claim 14, wherein the dubbing service is further to:

transcribe the extracted speech segments using automatic speech recognition prior to translation.

16. The system of claim 14, wherein the dubbing service is further to:

extract corresponding text for the extracted speech segments from captioning data of the audio/video file prior to translation.

17. The system of claim 14, wherein the extracted speech segments are annotated with a length and the machine translating is to generate translated, extracted speech segments of similar length.

18. The system of claim 14, incorporate background noise into the spoken version of the translated, extracted speech segments prior to replacing the extracted speech segments from the audio track of the audio/visual file with the spoken versions of the translated, extracted speech segments to generate a modified audio track.

19. The system of claim 14, wherein the dubbing service is further to:

incorporate non-speech noise into the spoken version of the translated, extracted speech segments prior to replacing the extracted speech segments from the audio track of the audio/visual file with the spoken versions of the translated, extracted speech segments to generate a modified audio track.

20. The method of claim 4, wherein biasing the artificial neural machine translation model to generate text segments in the target language of desired lengths comprises inputting length tokens to the artificial neural machine translation model.

* * * * *